United States Patent [19]

Volsin et al.

[11] Patent Number: 5,168,222

[45] Date of Patent: Dec. 1, 1992

[54] SIGNAL PROCESSOR CIRCUIT WITH SIGNAL MULTIPLEXING, SAMPLING AND MULTIPLYING FOR PROCESSING ORTHOGONALLY RECEIVED SIGNALS IN ELECTROMAGNETIC POSITION DETECTION SYSTEM

[75] Inventors: Gérard Volsin, Saint Medard-en-Jalles; Pascal Monin, Le Taillan Medoc, both of France

[73] Assignee: Sextant Avionique, France

[21] Appl. No.: 764,894

[22] Filed: Sep. 24, 1991

[30] Foreign Application Priority Data

Sep. 26, 1990 [FR] France .................. 90 11850

[51] Int. Cl.⁵ .................. F41G 1/00; F41G 9/00; G01B 7/30; G01B 15/00
[52] U.S. Cl. .................. 324/207.17; 89/41.19; 324/207.12; 324/207.25; 324/247; 340/870.32; 364/559
[58] Field of Search .................. 324/207.12, 207.17, 324/207.25, 207.26, 202, 244, 247, 260; 33/361; 340/870.31, 870.32, 686; 342/450, 451, 463; 364/559; 89/41.19, 41.21

[56] References Cited

U.S. PATENT DOCUMENTS

| 4,054,881 | 10/1977 | Raab ............... | 324/244 X |
| 4,560,930 | 12/1985 | Kouno ............. | 324/247 X |
| 4,635,207 | 1/1987 | Payne .............. | 324/247 X |
| 4,673,878 | 6/1987 | Tsushima et al. ... | 324/247 X |
| 4,688,037 | 8/1987 | Krieg .............. | 324/247 X |
| 4,829,250 | 5/1989 | Rotier ............. | 324/247 X |

FOREIGN PATENT DOCUMENTS 0021906 1/1981 European Pat. Off. .
0058412 8/1982 European Pat. Off. .

Primary Examiner—Gerard R. Strecker
Attorney, Agent, or Firm—Rosenman & Colin

[57] ABSTRACT

The system comprises a radiator, a sensor (21) fixed to the moving object, a circuit for processing the signals from the sensor in order to determine their amplitudes and a computation processor with a base of processing algorithms. The system also has a multiplexer (24) for sequentially multiplexing on one channel the detector signals from the sensor (21), a device (25) for sampling the signal coming from the multiplexer (24), of amplitude A and pulsation $\omega$, multipliers (30, 31) for multiplying the samples from the sampling device (25) respectively by reference signals $\omega t$ and $\cos \omega t$ and accumulates (33, 35, 34, 36) for accumulating the two sums of the products of the multiplications for a period at least equal to a period $$\frac{2\pi}{\omega}$$

before supplying them to the computation processor (22), which extracts from them the amplitude A.

The systrem can be applied well to a helmet aiming device.

8 Claims, 2 Drawing Sheets

SIGNAL PROCESSOR CIRCUIT WITH SIGNAL MULTIPLEXING, SAMPLING AND MULTIPLYING FOR PROCESSING ORTHOGONALLY RECEIVED SIGNALS IN ELECTROMAGNETIC POSITION DETECTION SYSTEM

BACKGROUND OF THE INVENTION

1. Field of the Invention

The principle of electromagnetic position detection is well known for determining the position and orientation of a solid moving object in a reference frame. One of the applications of this principle is the determination of the direction of aim of a helmet aiming device which an infantryman or a driver or pilot of a tank or aircraft has placed on his head, in order to control with it a weapon, missile or control camera, for example.

2. Description of Related Art

This detection principle uses a magnetic field emitter or radiator, connected to the reference frame, or reference system, in which the measurements are being carried out, a magnetic field receiver or sensor, fixed or movable, whose position and orientation have to be determined, and electronic processing circuits including analogue amplifiers, a computing processor and processing algorithms.

The radiator must as far as possible satisfy the conditions of the dipole theory, in which the system of coordinates for the mathematical description of the radiation is a sphere centered on the dipole and the Green free space function depends only on the radial coordinate.

The magnetic field sensor has as far as possible to be confined to a point. The emitter radiates a field, sequentially or by multiplexing, along two or three orthogonal axes and the sensor detects sequentially the components of this field according to three or two orthogonal axes, the emission and reception each generally taking place along three axes. The sensor thus supplies, per emission axis, three measurements, i.e. nine in total, which are organized in a 3×3 matrix, from which the processing algorithms supply the position and orientation of the sensor with respect to the radiator.

It will be noted here that the determination of the position and orientation of the sensor entails the determination of six variables—the three cartesian coordinates, the relative bearing, the elevation angle and the roll—and that at least six measurements are therefore necessary. If transmission takes place only along two axes, reception must consequently take place along three, and vice-versa.

In a given reference system the magnetic field at a given point is represented by a vector H. In this reference system, the sensitivity axes of the sensor are represented by a vector C. The results of the measurements made by the sensor can be arranged in the form of a matrix M corresponding to the scalar product C·H $$C \cdot H = C^T H = M$$

H being the matrix of the field and $C^T$ the transposed matrix of the matrix C of the sensitivity axes of the sensor.

The sensor, in the reference system, can undergo either a translational or rotational movement. Let us consider the latter, expressed by a matrix of rotation R.

The matrix of the sensitivity axes of the sensor becomes RC and that of the measurements $M_R$.

$$M_R = C^T R^T H$$

If the three axes of the sensor are orthonormed, $$C = \begin{pmatrix} 1 & 0 & 0 \\ 0 & 1 & 0 \\ 0 & 0 & 1 \end{pmatrix} = (1)$$

Consequently $$M_R = R^T H$$

H depending on the position of the sensor and $M_R$ on its position and orientation.

In the presence of magnetic perturbations, for example caused by the metallic mass of an aeroplane, the processing algorithms are based on cartographic surveys. In order to obtain this prior mapping, measurements of the field are carried out using the sensor at multiple points in space, with which are thus associated matrices of perturbed measurements. Let $M_C$ be one of these. If the sensor undergoes a rotation R, the matrix of measurements ought to become $$M_R = R^T M_C$$

$$M_R^T = M_C^T R$$

$$\begin{aligned} M_R^T M_R &= M_C^T R R^T M_C \\ &= M_C^T M_C \end{aligned}$$

The matrix product $M_R^T M_R$ is therefore rotation-invariant and representative of the point under consideration.

The mapping aims to determine the function f of correspondence between $M_C$ and $M_C^T M_C$.

During subsequent measurements, the product $M_R^T M_R$ corresponds to a matrix $M_R$.

As $M_R^T M_R = M_C^T M_C$, $M_C$, and therefore the position of the sensor, is deduced from this through the function f. In order to determine the matrix of rotation R, that is to say the orientation of the axes of the sensor, knowing $M_R$ and $M_C$, R is calculated from the equation $M_R = R^T M_C$, i.e., $$R = M_C M_R^{-1}$$

Through the document FR-A-2 458 838 (791441), a system for the electromagnetic determination of the position and orientation of a moving object is already known.

Diagrammatically the radiator and sensor in this system are each formed by a group of three identical current-controlled coils arranged respectively along three orthogonal axes. In order to incorporate as well as possible the conditions of the dipole, for both the radiator and the sensor, the dimensions of the coil are as small as possible. It would also be possible to substitute for each coil two half-coils with the same current passing through them. It would also be possible to consider, as the radiator and sensor, a sphere made from magnetic material surrounded by three orthogonal coils.

With respect to the circuit for processing the signals delivered by the sensor, in the prior art system referred to above, and which aims to determine the amplitudes of these signals, it has one channel per axis, and on each channel, with reference to FIG. 1, an amplifier 1 and an analogue feedback loop 2, between a mixer 3 and a bus 4 on the computing processor 5, in order to avoid the phenomena of crosstalk coupling and to improve the accuracy and, in the mixer 3, to subtract from the signal delivered a signal Vref in phase with the latter, of the same frequency and almost the same amplitude. The feedback is controlled by software in the computing processor 5 continuously updated in order to take account of the previous measurement. The reference signal supplied to the mixer 3 is fixed by a digital-to-analogue converter DAC 6 controlled by the processor 5. The output signal from the feedback loop 2 is supplied to the computing processor 5 after conversion in an analogue-to-digital converter ADC 7. Between the mixer 3 and the converter 7, the loop 2 comprises an amplifier 8, a demodulator 9 and integrator 10. The demodulator 9 provides a synchronous and consistent demodulation and rectifies the signal coming from the mixer 3 by multiplication by the signal Vref of the same frequency and in phase. The integrator 10 integrates the signal from the demodulator 9 over a period determined by the processor 5 and the result of the integration is digitized in the AD converter 7.

But such a processing circuit has drawbacks. It has to be calibrated before each measurement. The input signals to the mixer 3 and the demodulator 9 have to be absolutely in phase.

The present invention aims to overcome these drawbacks.

SUMMARY OF THE INVENTION

To this end, the present invention relates to a system for the electromagnetic determination of the position and orientation of a moving object comprising a magnetic radiator, linked to a reference system, a magnetic sensor, fixed to the moving object, the radiator sequentially radiating fields along orthogonal transmission axes and the sensor sequentially supplying signals for detecting the components of the transmission fields along orthogonal reception axes, the product of the number of transmission axes and the number of reception axes being at least six, a circuit for processing the signals from the sensor in order to determine their amplitudes and a computation processor with a base of algorithms for processing, a system characterized by the fact that it has a multiplexer connected to the sensor output, for sequentially multiplexing on one channel the detection signals from the sensor, a device for sampling the signal coming from the multiplexer, of amplitude A and pulsation $\omega$ and corresponding to a pair of two transmission and reception axes, means for multiplying the samples from the sampling device respectively by reference signals sin $\omega t$ and cos $\omega t$ and means for accumulating the two sums of the products of the multiplications for a period at least equal to a period $$\frac{2\pi}{\omega}$$

before supplying them to the computation processor, which extracts from them the amplitude A.

The system of the invention derives its interest from the fact that the sensor signals processing circuit constitutes a single unit, from its simplicity, permitting an entirely digital processing, and from its insensitivity to phase displacement. Advantageously, the sampling device comprises a rapid, so-called "flash" analogue-to-digital converter, and the samples from the converter are processed in at least one rapid multiplier-accumulator MAC.

Preferably, the system has two rapid multiplier-accumulators receiving respectively the two reference signals sin $\omega t$ and cos $\omega t$.

BRIEF DESCRIPTION OF THE DRAWINGS

The invention will be understood better by means of the following description of the circuit for processing the sensor signals of the system of the invention, with reference to the accompanying drawing, in which.

DETAILED DESCRIPTION OF THE PREFERRED EMBODIMENT

Figure 1:
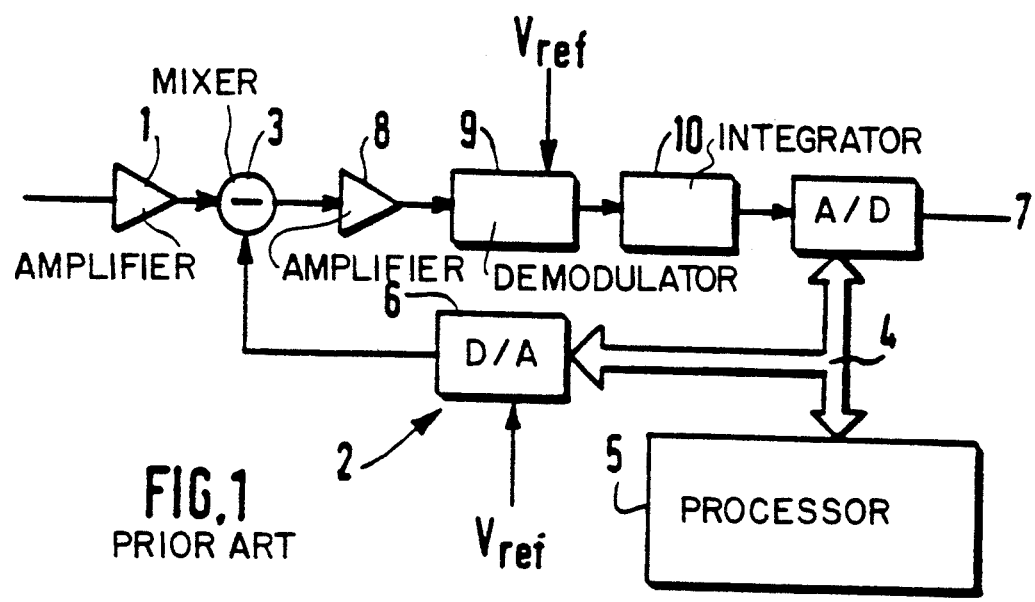
FIG. 1 shows a processing circuit of the prior art, already described above.
Figure 2:
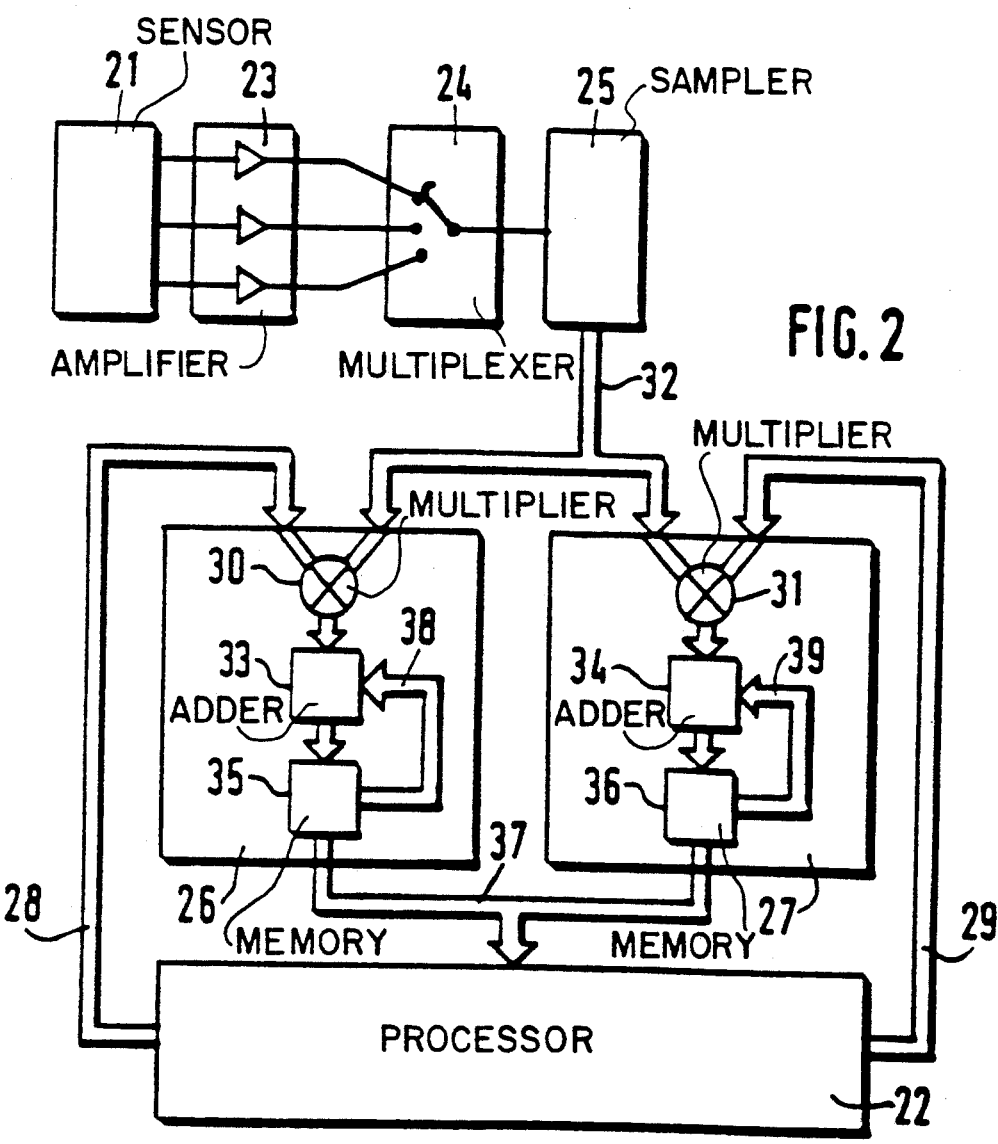
FIG. 2 shows a processing circuit of the system of the invention.

With reference to FIG. 2, the circuit for processing the signals of the sensor 21, receiving the magnetic fields emitted by an emitter, comprises, in series between the sensor and the computing processor 22, a preamplification unit 23, with a preamplifier on each of the reception channels, in this case three in number, a sequential multiplexer 24, a sampling unit 25, in this case consisting of a rapid analogue-to-digital converter of the "flash" type, and two rapid multiplier-accumulators MAC 26, 27 in parallel. It will be noted that the emitter, or radiator, is connected to the processor 22 through a power amplification unit.

Through two buses 28, 29 coming from the processor 22, the two MACs receive respectively on two multipliers 30, 31 two reference signals sin $\omega t$ and cos $\omega t$, the two multipliers 30, 31 also receiving from the sampling unit 25, through a bus 32, the signal A cos $(\omega t + \phi)$ corresponding to one of the pair of two transmission and reception axes, $\phi$ representing the phase difference of the signal received compared with the reference signals, each of the signals associated respectively with all the transmission and reception axis pairs being captured by means of the sequential multiplexing on one channel of the multiplexer 24. Each rapid multiplier-accumulator 26 (27) has a digital adder 33 (34) receiving the signal from the multiplier 30 (31), and a memory register 35 (36), connected by a bus 37 to the processor 22 and by a bus 38 (39) to the adder 33 (34).

The samples of the signal A cos $(\omega t + \phi)$ are multiplied by sin $\omega t$, cos $\omega t$ in the multiplier 30, 31. The product of each multiplication is added digitally in the adder 33, 34 to the result previously accumulated in the register 35, 36, the new result overwriting the previous one in the register 35, 36. These multiplication, addition and accumulation operations are repeated over a period in this case equal to several periods $$\frac{2\pi}{\omega}$$

before the accumulated result is transferred into the processor 22 for working and computation of A and determination of the position and orientation sought for by determination of the matrices $M_R$, $M_C$ and R.

Simply by way of explanation, the functioning of the multiplier-accumulators MAC 26, 27 can be explained mathematically as follows:

First MAC

This receives as an input from its multiplier 30 Sampled $A \cos(\omega t + \phi)$ and $\sin \omega t$.

The output from its multiplier supplies:

$$\begin{aligned} A\cos(\omega t + \phi)\sin\omega t &= A(\cos\omega t \cos\phi - \sin\omega t \sin\phi)\sin\omega t \\ &= A(\cos\omega t \sin\omega t \cos\phi - \sin^2\omega t \sin\phi) \\ &= A\left(\frac{\sin 2\omega t}{2}\cos\phi - \frac{1-\cos 2\omega t}{2}\sin\phi\right) \\ &= -\frac{A}{2}\sin\phi - \frac{A}{2}(\sin 2\omega t \cos\phi + \cos 2\omega t \sin\phi) \end{aligned}$$

Because of the accumulation of the products of the multiplication over a long period, in this case equal to several periods $$NT = \frac{2\pi N}{\omega}$$

the terms depending on $\omega t$ cancel each other out, and thus the continuous term $$-\frac{A}{2}\sin\phi$$

is extracted.

Second MAC

This receives as an input from its multiplier 31 sampled $A\cos(\omega t + \phi)$ and $\cos \omega t$.

The output from its multiplier supplies:

$$\begin{aligned} A\cos(\omega t + \phi)\cos\omega t &= A(\cos\omega t \cos\phi - \sin\omega t \sin\phi)\cos\omega t \\ &= A(\cos^2\omega t \cos\phi - \sin\omega t \cos\omega t \sin\phi) \\ &= A\left(\cos\phi\frac{1+\cos 2\omega t}{2} - \frac{\sin 2\omega t}{2}\sin\phi\right) \\ &= \frac{A}{2}\cos\phi + \frac{A}{2}(\cos 2\omega t \cos\phi - \sin 2\omega t \sin\phi) \end{aligned}$$

Because of the accumulation of the products of the multiplication over a long period, in this case equal to several periods $$NT = \frac{2\pi N}{\omega}$$

the terms depending on $\omega t$ cancel each other out and thus the continuous term $$\frac{A}{2}\cos\phi$$

is extracted.

The processor 22 squares the two results $$\frac{A^2}{4}\sin^2\phi \text{ and } \frac{A^2}{4}\cos^2\phi.$$

adds them $\frac{A^2}{4}(\sin^2\phi + \cos^2\phi) = \frac{A^2}{4}$ and extracts the square root of the sum in order to determine $$\frac{A}{2}$$

and therefore A.

It has been seen above that the samples of the signals were multiplied by $\sin \omega t$ and $\cos \omega t$ in the multipliers and that the products of the multiplications were added digitally in the adders of the multiplier-accumulators. The processing could also be carried out in an analogue fashion so that the two channels would be digitized only after integration over the period under consideration, at least equal to $$\frac{2\pi}{\omega},$$

just before supplying the accumulated and digitized results to the processor.

It has also been seen above that, in the system of the invention, the amplitude A of the signal $A \cos(\omega t + \phi)$ coming from the sampling unit 25 was calculated. In fact, the result of the calculation is marred by an error due notably to interference couplings (couplings between axes, capacitive or choke couplings with the output wires from the sensor), in brief, to faults in the sensor. In order to eliminate this error, it is possible first to carry out a calibration of the sensor in order to determine the phase angle $\phi_u$ of the useful measurement. To do this, with the emitter not in operation, a measurement is carried out, using a voltmeter, at the output from the multiplier-accumulators MAC, the phase difference $\phi_1$ of an electrical signal supplied by a calibration generator in series with the sensor reception coil under consideration. The phase rotation $\phi_2$ caused by the pre-amplification unit 23 is then derived, still using the voltmeter. Finally, the phase difference $\phi_3$ caused by the emitter in operation is measured.

Figure 3:
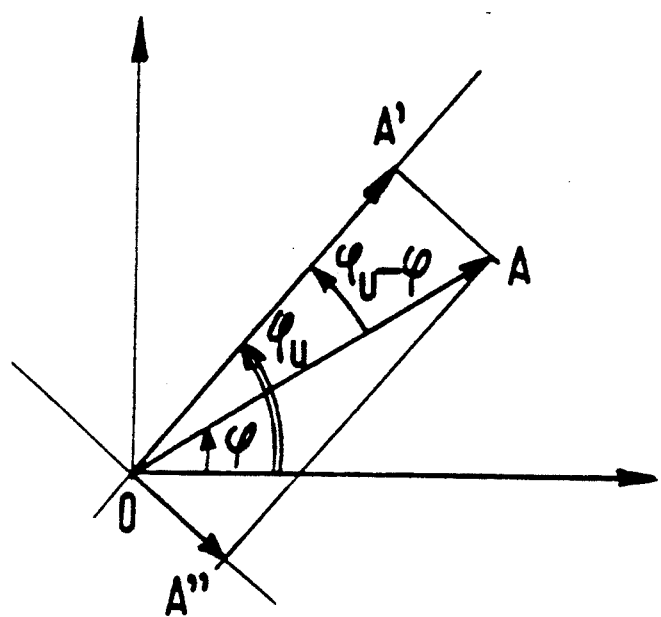
FIG. 3 illustrates the calibration of the sensor of the circuit of FIG. 1.

These coupling faults, or crosstalk, generate a measurement component perpendicular to the useful component, in accordance with the drawing of FIG. 3.

The phase angle of the useful measurement is equal to $$\phi_u = \phi_2 + \phi_3 + 90°$$

Let therefore $\phi$, the phase difference, with respect to the reference X-axis, of the amplitude measurement axis, be $$A = |OA|$$

The vector OA is the resultant of the component OA', along the out-of-phase useful measurement axis of $\phi_u$, whose useful amplitude it to be determined, and of a component OA" perpendicular (+90° or −90° depending on whether capacitive or choke couplings are being considered) to the component OA'.

Knowing A, A' is calculated = |OA'| by the relationship $$A' = A \cos(\phi_u - \phi)$$

As for the phase angle $\phi$, $$\frac{A}{2} \cos\phi \text{ and } \frac{A}{2} \sin\phi,$$

and therefore $\cos \phi$ and $\sin \phi$, having been determined, this is given by the relationship $$\phi = \text{Arc } tg \frac{\sin\phi}{\cos\phi}$$

The computations of $\phi$ and A' are carried out by the processor 22, which therefore also constitutes a means of measurement correction.

We claim:

1. In a system for electromagnetically determining the position and orientation of an object by sequentially radiating electromagnetic fields along orthogonal transmission axes in a reference frame to generate sensor detection signals over multiple sensor channels by a sensor connected to the object and responsive to the radiated electromagnetic fields along orthogonal reception axes, a signal processor circuit for processing the sensor detection signals, the signal processor circuit comprising:

(a) multiplexer means for sequentially multiplexing the sensor detection signals from said multiple sensor channels to produce at a single output of said multiplexer means multiplexed signals, each representative of a signal from a respective sensor channel and being of form A cos ($\omega t + \phi$), where A is the amplitude, $\omega$ is the frequency and $\phi$ is the phase of a respective multiplexed signal;

(b) sampler means for sampling each of the multiplexed signals to produce a plurality of signal samples for each sensor channel;

(c) reference means for generating reference signals of form cos ($\omega t$) and sin ($\omega t$);

(d) multiplier means for multiplying each of the signal samples from each channel by one of the reference signals to produce a plurality of first products, and by the other of the reference signals to produce a plurality of second products;

(e) accumulator means for adding each of the first products to produce a first sum, and each of the second products to produce a second sum, and for accumulating each respective sum over a time period at least equal to $2\pi/\omega$; and (f) means for processing each accumulated sum to determine the amplitude A and, in turn, the position and orientation of the object.

2. The signal processor circuit according to claim 1, wherein the sampler means includes an analog-to-digital converter for producing digitized signal samples.

3. The signal processor circuit according to claim 2, wherein the multiplier means and the accumulator means are integrated into a pair of multiplier-accumulator units, said units being electrically interconnected in parallel.

4. The signal processor circuit according to claim 3, wherein each multiplier-accumulator unit has a first input for a respective reference signal, a second input for the signal samples, and an output to the processing means.

5. The signal processor circuit according to claim 3, wherein each multiplier-accumulator unit includes an adder and a memory register.

6. The signal processor circuit according to claim 1, wherein the accumulator means is operative to accumulate each respective sum over a time interval equal to several time periods.

7. The signal processor circuit according to claim 1, wherein the processing means includes means for squaring each accumulated sum and means for adding the squared sums together.

8. The signal processor circuit according to claim 1, wherein the processing means includes means for correcting the determination of the amplitude A.

* * * * *